United States Patent
Miyamoto et al.

(10) Patent No.: US 6,309,485 B1
(45) Date of Patent: Oct. 30, 2001

(54) METHOD AND APPARATUS FOR MANUFACTURE OF LAMINATED OPTICAL DISC

(75) Inventors: Hisaki Miyamoto, Suita; Kiyoshi Inoue, Osaka; Hirokazu Itou, Katano; Toshikazu Kozono, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/147,140

(22) PCT Filed: Apr. 18, 1997

(86) PCT No.: PCT/JP97/01345

§ 371 Date: Dec. 17, 1998

§ 102(e) Date: Dec. 17, 1998

(87) PCT Pub. No.: WO97/40494

PCT Pub. Date: Oct. 30, 1997

(30) Foreign Application Priority Data

Apr. 19, 1996 (JP) .................................... 8-098241

(51) Int. Cl.$^7$ .......................... B32B 31/04; B32B 31/12; B32B 31/14; G11B 7/26

(52) U.S. Cl. .......................... 156/64; 156/74; 156/275.5; 156/275.7; 156/295; 156/356; 156/379.8; 156/538; 156/578

(58) Field of Search .................................. 156/74, 275.5, 156/275.7, 295, 578, 379.8, 538, 64, 356; 118/712, 50.1, 52; 427/240

(56) References Cited

U.S. PATENT DOCUMENTS 4,420,510 * 12/1983 Kunkel et al. .
4,814,198    3/1989 Baecklund .

(List continued on next page.)

FOREIGN PATENT DOCUMENTS

| 408763 | 1/1991 | (EP) . |
|---|---|---|
| 706178 | 4/1996 | (EP) . |
| 744739 | 11/1996 | (EP) . |
| 61-292242 | 12/1986 | (JP) . |
| 62-12940 | 1/1987 | (JP) . |
| 63-124248 | 5/1988 | (JP) . |
| 63-239628 | 10/1988 | (JP) . |
| 2-37543 | 2/1990 | (JP) . |
| 3-166279 | 7/1991 | (JP) . |
| 4-139630 | 5/1992 | (JP) . |
| 5-20713 | 1/1993 | (JP) . |
| 6-215419 | 8/1994 | (JP) . |
| 7-282474 | 10/1995 | (JP) . |
| 8-36786 | 2/1996 | (JP) . |

OTHER PUBLICATIONS

English Language Abstract of JP No. 5–20713.

English Language Abstract of JP No. 63–239628.

(List continued on next page.)

Primary Examiner—Steven D. Maki
(74) Attorney, Agent, or Firm—Greenblum & Bernstein, P.L.C.

(57) ABSTRACT

A method and apparatus for the manufacture of laminated compact disc. When forming an adhesive layer between a first substrate and a second substrate, and laminating the first substrate and second substrate to produce a disc, temperature and other conditions are adjusted based on the adhesive layer thickness of the manufactured optical disc, thus the viscosity of adhesive is changed to match each process. Accordingly, high quality discs can be consistently manufactured, and the operating efficiency of the manufacturing apparatus can be improved. Moreover, an optical disc free of bubbles mixed in the adhesive layer of a laminated optical disc can be stably manufactured.

26 Claims, 10 Drawing Sheets

U.S. PATENT DOCUMENTS

| | | | | |
|---|---|---|---|---|
| 4,877,475 | * | 10/1989 | Uchida et al. | 156/74 |
| 5,501,760 | * | 3/1996 | Mukawa | 156/275.7 |
| 5,744,193 | * | 4/1998 | Kitano | 156/578 |
| 5,759,332 | * | 6/1998 | Itoigawa et al. | 156/74 |
| 5,779,855 | * | 7/1998 | Amo et al. | 156/379.8 |
| 5,800,670 | * | 9/1998 | Kitano | 156/74 |
| 5,843,257 | * | 12/1998 | Inouchi | 156/74 |
| 5,882,451 | * | 3/1999 | Sasaki et al. | 156/578 |
| 5,938,891 | * | 8/1999 | Kashiwagi et al. | 156/578 |
| 5,951,806 | * | 9/1999 | Amo et al. | 156/275.5 |
| 6,080,249 | * | 6/2000 | Honma et al. | 156/356 |
| 6,106,657 | * | 8/2000 | Rossignol et al. | 156/275.5 |

OTHER PUBLICATIONS

English Language Abstract of JP No. 2–37543.
English Language Abstract of JP No. 4–139630.
English Language Abstract of JP No. 61–292242.
English Language Abstract of JP No. 63–124248.
English Language Abstract of JP 8–36786 (Patent Abstracts of Japan vol. 96, No. 006, Jun. 28, 1996).
English Language Abstract of JP 62–12940 (Patent Abstract of Japan vol. 11, No. 186, Jun. 16, 1987).
English Language Abstract of JP 7–282474 (Patent Abstract of Japan vol. 96, No. 186, Jun. 16, 1987).
Englsih Language abstract XP–002164901, Database WPI, Section Ch, Week 199135, Derwent Publications Ltd. London , GB, A21, AN 1991–256235.
English Language Abstract of JP 6–215419 (Patent Abstracts of Japan vol. 18, No. 587, Nov. 10, 1994).
English language abstract of JP 8–36786.
English language abstract of JP 7–282474.

* cited by examiner

METHOD AND APPARATUS FOR MANUFACTURE OF LAMINATED OPTICAL DISC

FIELD OF TECHNOLOGY

The present invention relates to a manufacturing method and manufacturing apparatus for an optical disc recording medium comprised of a plurality of laminated substrates, and relates more particularly to a method and apparatus for laminating two substrates.

BACKGROUND TECHNOLOGY

To achieve a higher recording density in an optical disc recording medium, it is necessary to shorten wavelength of laser used for recording and reproduction while concomitantly increasing a numeric aperture (NA) of an objective lens. However, when tilt occurs between the disc and the laser beam axis as a result of disc rotation or deformation, the focal point of the laser becomes off set from the correct position on the information signal surface of the disc. Primary types of tilting include so-called radial tilt, in which the optical disc recording medium sags of its own weight in a conical manner when the disc is loaded in an optical disc drive apparatus, and so-called tangential tilt, in which the optical disc recording medium tilts in the circumferential direction as a result of the attitude of the optical disc drive apparatus itself or the dimensional precision of loading the optical disc recording medium in the optical disc drive apparatus.

It is necessary to make the recording pits larger to compensate for an offset in the laser beam focal point caused by tilting, and this makes it extremely difficult to increase the recording density. The offset in the laser beam focal point can be reduced if the thickness of the optical disc recording medium substrata is made thinner. However, because disc rigidity drops if the substrata of the optical disc recording medium is made thinner, even greater tilt easily occurs, and not only is the effect of making the substrata thinner impaired, the offset in the laser beam focal point becomes even greater.

Increasing the mechanical strength of an optical disc recording medium by laminating two substrates together is an extremely effective means for preventing tilting of a disc as a result of making the substrates thinner. The recording capacity of a single optical disc recording medium can also be doubled by disposing an information signal surface on two sides of the laminated substrates. For example, when an optical disc recording medium is made by laminating two substrates, it is possible to manufacture a single-sided, single-layer disc OD1 in which a method signal surface is disposed on only one surface of the disc, a single-sided, double-layer disc OD2 in which an information signal surface is disposed in two layers on a single side of the disc, or a double-sided, single-layer disc OD3 in which a single information signal surface is disposed on opposite sides of the disc. An example of a single-sided, single-layer disc OD1 is shown in FIG. 13, a single-sided, double-layer disc OD2 is shown in FIG. 14, and a double-sided, single-layer disc OD3 is shown in FIG. 15. Note that, in each figure, Ls indicates the recording/reproducing laser beam, RS indicates the information recording surface, AS indicates an adhesive layer, and PL indicates a protective layer.

In the case of a single-sided, double-layer disc OD2 as shown in FIG. 14, the laser beam LS2 for recording and reproducing information recording surface RS1 in FIG. 1 must pass through the adhesive layer AS. In addition, a label layer for displaying a title and other disc contents cannot be provided in the case of a double-sided, single-layer disc OD3 shown in FIG. 15.

Methods for manufacturing an optical disc recording medium by laminating a plurality of substrates in this manner can be broadly classified in two based on the coating method of the adhesive for laminating the substrata, i.e., one is a printing method and the other is a spin-coating method. First describing the printing method below with reference to FIG. 11 and FIG. 12, thereafter the spin-coating method is described with reference to FIG. 16, FIG. 17, FIG. 18, and FIG. 19.

An optical disc recording medium manufacturing method using the printing method is simply shown in FIG. 11 and FIG. 12. Using a thermoplastic resin having a high viscosity at room temperature, an adhesive PP is uniformly coated through a screen SP onto the entire surface of a substrate 6 while moving a spatula 60 in a particular direction Ds; and two such substrates are then positioned with the thermoplastic resin PP coated surfaces thereof in mutual opposition, and heated until the thermoplastic resin is becomes soft, and then pressure is applied to press the two substrates together, thereby bonding the two substrates to produce an optical disc recording medium.

However, because the thermoplastic resin is non-transparent, it cannot be used in the manufacture of a single-sided, double-layer disc OD2. In addition, when another substrate is pressed to the thermoplastic resin PF coated onto the entire surface of a substrate, a large number of bubbles necessarily occur between the resin PP and the substrate because of the surface contact therebetween, and the substrates are bonded with these bubbles trapped in the adhesive layer. Because bubbles trapped in this adhesive layer disperse the laser beam and interfere with data recording and reproducing, the printing method cannot be applied to the manufacture of an optical disc recording medium comprising an information recording layer written and read by a laser beam passing through an adhesive layer as in a single-sided, double-layer disc OD2, even if a transparent thermoplastic resin becomes possible in the future.

Moreover, because thermoplasticity is a reversible reaction, exposure to a temperature exceeding the thermoplastic temperature even after substrates are laminated and a finished optical disc recording medium is produced may loosen the adhesive layer and the laminated substrates may warp of their own weight, even resulting in the worse case the top and bottom substrates are displaced or separated. Because the viscosity of the thermoplastic material is high, adhesive that protrudes when the substrates are laminated must be mechanically removed. In addition, the thickness distribution of print layer PP varies between discs in the diametric direction or in the direction Ds of the spatula 60 movement as a result of print coating as shown in FIG. 12. That is, if the distance between substrate 6 and screen SP at diametrically opposite edges of substrate 6 is S1 and S2, the thickness of the adhesive layer on substrate 6 will vary in the diametric direction by |D1–D2|. As a result, because the thickness varies in the radial direction at the same circumference, quality problems arise in discs that are rotated for use.

In one printing method a light-permeable light-setting resin is used in place of a thermoplastic resin as the adhesive. In this case, a light-setting resin with a high viscosity similar to the thermoplastic resin is used and printed to the substrates using a method such as shown in FIG. 11 and FIG. 12. The adhesive surface side of the substrate is then exposed to light to slightly set the adhesive, and pressure is applied in a manner pressing the two substrates together, thereby bonding the two substrates and producing an optical disc recording medium. While a light-permeable resin can be used as the adhesive in this method, printing the entire surface again results in bubbles being sealed in the adhesive layer when the substrates are put together. That is, this method cannot be used for the manufacture of a single-sided, double-layer disc OD2. In addition, qualitative problems in the finished optical disc recording medium are involved as a result of variations in adhesive thickness in the radial direction and at the same circumference of the substrate.

A manufacturing method for a single-sided, double-layer disc OD2 using a conventional spin coating method is described briefly below with reference to FIG. 16, FIG. 17, FIG. 18, FIG. 19, and FIG. 20. It should be noted that the optical disc recording medium OD2 is produced by bonding a first substrate 6 and a second substrate 9, which are pre-manufactured using a polycarbonate or other transparent resin by means of an injection molding or other method. A first information recording surface RS1 is disposed on one side of the first substrate 6, and a reflection film is formed on the information recording surface RS1 by such means as sputtering or vacuum vapor deposition. Aluminum is primarily used for this reflection film. A second information recording surface RS2 and reflection film are likewise formed on one side of the second substrate 9. The substrate 6 and substrate 9 thus prepared are then laminated by the below procedure to complete an optical disc recording medium OD2

The work conditions are first set in step #100P. These work conditions primarily include the number of rotations N of the substrate when light-setting resin PP is dropped on the substrate; weight V(g) of the light-setting resin PP dropped on the substrate; weight per second v of the light-setting resin PP dropped on the substrate; rotational speed r1 (rpm) of the substrate when the light-setting resin PP is dropped on the substrate; viscosity υ (cps) of the light-setting resin PP; rotational speed r2(rpm) of the substrate when the light-setting resin PP is spread; and rotation time t (sec) of the disc when the light-setting resin PP is spread. The intent of these conditions is explained in the following steps. After setting these conditions to specific values, the flow continues to the next step #300.

In the next step #300, as shown in FIG. 16, while the first substrate 6 is spun N times at a low speed rotational speed r1, a light-setting resin PP of Vg used as the adhesive of the laminated substrates is coated in a donut-shaped pattern concentrically to center hole H of the substrate 6 on the side opposite the recording surface RS1 thereof. The task performed in this step is called the "adhesive coating process". The procedure then continues to step #400.

In step #400, as shown in FIG. 17, the substrate 9 is placed on the substrate 6 with its information recording surface RS2 facing the light-setting resin PP. The task performed in this step is called the "substrate matching process". The procedure then continues to step #500P.

In step #500P as shown in FIG. 18, the substrate 6 and substrate 9 are rotated as one body for time t at a high speed rotational speed r2 to spread the light-setting resin PP between the substrate 6 and the substrate 9 by means of a centrifugal force. The procedure then continues to step #700P. This process is called adhesive spreading. It should be noted that any unused light-setting resin PP overflowing from the substrates in this process and in the light-setting resin PP coating process shown in FIG. 16 is recovered, filtered to remove any contaminants, processed to remove any introduced bubbles, and then reused.

In step #700P, as shown in FIG. 19, ultraviolet light is emitted through the second substrate 9 toward the light-setting resin RS1 on the first substrate 6, curing the light-setting resin PP, and fixing the two substrates 6 and 9 integrally laminated. This process is called "bonding". Lamination and production of the optical disc recording medium is thus completed.

It should be noted, however, that even when the work conditions are set in step #100P, the optimum conditions are continuously changing as a result of factors such as changes in ambient temperature and deterioration of the recovered light-setting resin PP. In addition, the amount of light-setting resin PP dropped to the inside circumference part of substrate 6 changes as a result of slight variations in the drop position and volume of the light-setting resin PP, and the temperature of the coating environment. Therefore, even if the light-setting resin PP spreads evenly through the inside circumference part of the disc, the inside circumference edge of the light-setting resin PP layer varies relative to the substrate 6, and good quality cannot be consistently achieved because of varied thickness in the light-setting resin PP layer.

In addition, if the viscosity of the dropped light-setting resin PP is low in the light-setting resin PP dropping step #300, reaction to movement during transportation of the substrate 6 to the next spreading process after resin dropping produces a force that acts on the dropped light-setting resin PP, and causes the light-setting resin PP to spread on the substrate 6 and overflow Because of this spreading of the light-setting resin PP in the transportation direction, variations in the thickness of the light-setting resin PP occur both circumferentially and radially in the transportation direction of the disc, and it becomes difficult to make the light-setting resin PP extend uniformly through the inside circumference part of the disc.

It the light-setting resin PP is thus unevenly distributed and drips from the disc, the substrate 9 cannot be superposed to substrate 6 with linear contact between the substrate 9 and the light-setting resin PP, and the contact area expands. Imposing the substrate 9 on an unevenly distributed light-setting resin PP can easily trap air bubbles between the light-setting resin PP and the substrate 9. Air bubbles remaining in the adhesive layer when the light-setting resin PP is cured cause the laser beam to disperse, and prevent the laser beam from being normally emitted to and reflected from the information recording surface. As a result, air bubbles are fatal flaw in a single-sided, double-layer disc wherein information is recorded and reproduced to the recording surface RS1 of a bottom substrate 6 through an adhesive layer.

In addition, even if bubbles can be removed before curing, that is, when spreading, the light-setting resin PP, variations in the thickness of the light-setting resin PP in the circumferential and transportation directions significantly impair disc recording and read/write precision. This is because the laser is emitted to a data track disposed winding circumferentially to the disc during disc recording and reproducing, and the emission angle of the laser to the track fluctuates irregularly in conjunction with disc rotation.

In addition, when the light-setting resin PP is coated and spread with the spin coating method, the thickness of the light-setting resin PP at the inside circumference of the disc tends to become thinner than at the center of the disc. Therefore, to reduce deviations in the light-setting resin PP thickness, it is necessary to drop the light-setting resin PP as much as possible to the inside circumference side of the substrate 6 so that the light-setting resin PP layer becomes thicker at the inside circumference part of the disc after spreading. However, if the viscosity of the light-setting resin PP is low, the light-setting resin PP will spread on the substrate even if the light-setting resin PP is dropped as much as possible at the inside circumference of the disc, and the light-setting resin PP will protrude from a center hole H of the substrate. Curing the light-setting resin PP in this condition will result in degraded roundness of the center hole H as a result of the light-setting resin PP protruding from the center hole, and will be a factor in disc eccentricity. However, when the thickness of the light-setting resin PP varies in the radial direction of the disc, the light-setting resin PP layer thickness is held uniform in the circumferential direction, and the laser emission angle and aperture on the signal surface are held constant within a single data track revolution unit, and the recording and reading precision can be compensated.

It is therefore necessary to increase the viscosity of the light-setting resin PP in order to prevent bubbles from entering the light-setting resin layer, make the light-setting resin PP reach evenly throughout the inside circumference part of the disc, and reduce variations in middle layer thickness. However, as the viscosity of the light-setting resin PP increases, the time required for filtering and defoaming the recovered light-setting resin PP increases, and the operating efficiency of the apparatus is deteriorated.

When the disc is transported after spreading the light-setting resin, a load is applied to the uncured light-setting resin layer, during transportation, and disc appearance can become worse as a result of bubbles getting into the uncured light-setting resin layer at the inside circumference part of the disc.

There has also not been a simple, effective method for suppressing the offset between the centers of the two laminated substrates to a degree of several ten micrometers with good precision.

Therefore, an object of the present invention is to provide a method and apparatus for laminating production of an optical disc recording medium that is free of the above-described deficiencies of conventional optical disc lamination production methods, free of bubbles in the adhesive layer and resultant obstruction of laser passage, and whereby variations in adhesive layer thickness in the radial and circumferential directions of the optical disc recording medium are suppressed and dimensional precision is assured.

In addition, an object of the present invention is to provide a method and apparatus whereby manufacturing process quality is evaluated based on the precision of the adhesive layer of the manufactured optical disc recording medium, and then the manufacturing conditions are automatically corrected based on the result of the evaluation, and when the manufacturing process quality exceeds the correction capacity, an abnormal state is determined and production is interrupted.

DISCLOSURE OF THE INVENTION

A laminated optical disc manufacturing apparatus for manufacturing an optical disc by laminating at least a first substrate and a second substrate, said apparatus comprises: adhesive coating means for coating an adhesive between said first and second substrates and forming an adhesive layer having a specific thickness; a layer thickness difference detection means for obtaining a layer thickness difference between the specified adhesive layer thickness and a target adhesive layer thickness; and a control means for controlling said adhesive coating means based on the layer thickness difference.

DESCRIPTION OF THE PREFERRED EMBODIMENTS

Figure 1:
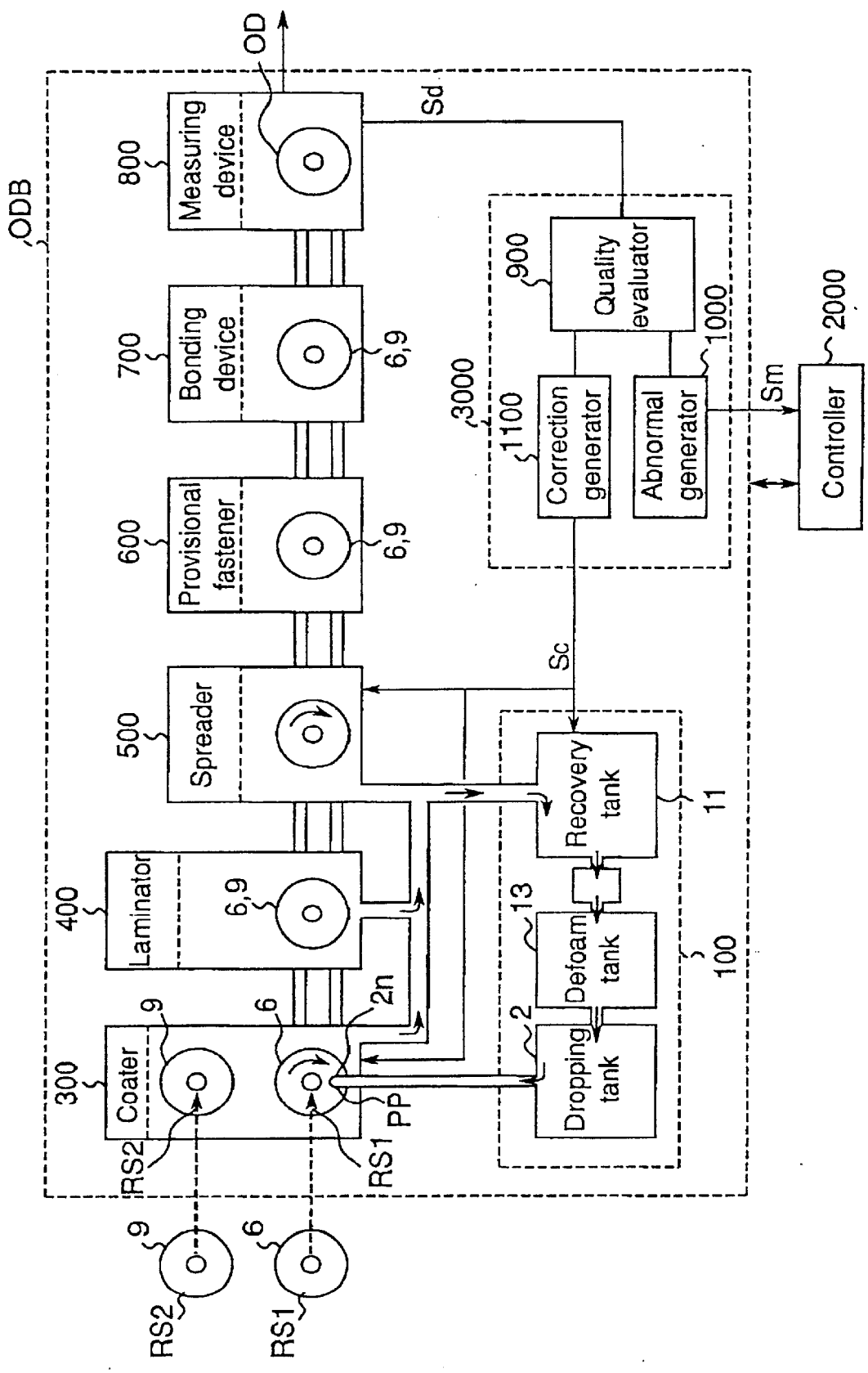
FIG. 1 is a block diagram showing a configuration of an optical disc lamination manufacturing apparatus according to the present invention.

The present invention is described in detail below with reference to the accompanying drawings. FIG. 1 shows a typical configuration of an optical disc lamination manufacturing apparatus according to the present invention. The optical disc lamination manufacturing apparatus ODB comprises a coating device 300, laminating device 400, spreading device 500, temporary holding device 600, bonding device 700, measuring device 800, quality evaluation device 900, abnormal signal generator 1000, correction signal generator 1100, recovery tank 11, filter 12, defoaming tank 13, dropping tank 2, and controller 2000. The dropping tank 2, recovery tank 11, filter 12, and defoaming tank 13 constitute an adhesive supply source 100. The coating device 300, the laminating device 400, and the spreading device collectively comprise an adhesive coating device. Additionally, the adhesive coating device may further comprise the adhesive supply source 100. The dropping tank 2 stores a light-setting resin PP at a specific temperature T, and thereby keeps the adhesive at a specific viscosity υ. It should be noted that a light-setting resin that is normally a gel but hardens when exposed to ultraviolet rays is described as the adhesive of the present invention, and especially as the adhesive of the present embodiment, but other light-setting resins or other adhesives so long as the same effect is achieved by exposure to gamma radiation or other radiation, can be used. Resins of which the primary constituents are acrylate oligomers and acrylate monomers can be used as a UV-cure resin.

The controller 2000 sets the work parameters of the various component devices of the optical disc lamination manufacturing apparatus ODB, to control the operation of the components and control the overall operation of the optical disc lamination manufacturing apparatus ODB. Included in these parameters are: number of rotations N of the substrate when light-setting resin PP is dropped on the substrate; weight V(g) of the light-setting resin PP dropped on the substrate; weight per second v of the light-setting resin PP dropped on the substrate; rotational speed r1 (rpm) of the substrate when the light-setting resin PP is dropped on the substrate; viscosity υ (cps) of the light-setting resin PP; rotational speed r2 (rpm) of the substrate when the light-setting resin PP is spread; rotation time t (sec) of the substrate when the light-setting resin PP is spread; and suction pressure P (mmhg) suctioning the light-setting resin PP to the inside circumference part during resin spreading.

The first substrate 6 and second substrate 9 prepared in a previous process are supplied to the coating device 300. The coating device 300 may be embodied as an annular coating device. It should be noted that the first substrate 6 is supplied with the information recording surface RS1 onto the upper side thereof, that is, with the protective layer onto the lower side thereof. The second substrate 9, on the other hand, is normally provided with the information recording surface RS2 set onto the lower side thereof, that is, with the protective layer set onto the upper side thereof. While the first substrate 6 is rotated a specific N number of times at a specific low rotational speed r1, a specific weight Vg of the light-setting resin PP used as the adhesive of the substrates to be laminated is dropped from a dropping nozzle 2n of the dropping tank 2 such that the light-setting resin PP is coated to form an annular mound concentrically to the center hole H of the substrate 6. It should be noted that the formed light-setting resin PP has a ridge peak shaped, that is, a curved surface with a tapered peak in vertical cross section. The second substrate 9, and the first substrate 6 coated with light-setting resin PP, are then supplied to the laminating device 400 by a transportation means (not shown in the figure).

With the protective layer PL2 of the second substrate 9 facing down, the laminating apparatus 400 aligns the second substrate 9 parallel with the top of the first substrate 6. The laminating apparatus 400 may also be termed as a superimposing device. At this time, the protective layer PL2 of the second substrate 9 makes linear contact with the peak of the annular mound CA of the light-setting resin PP, which has a conical cross section formed on the first substrate 6, and the second substrate 9 is then pressed a specific amount to the first substrate 6. As a result, the annular mound CA spreads in contact with the protective layer PL2 of the second substrate 9 and the protective layer PL1 of the first substrate 6, thereby making surface contact therewith, and making it possible to prevent the introduction of bubbles between the light-setting resin PP and the protective layers PL1 and PL2. The first substrate 6 and second substrate 9 thus combined in lamination are then supplied to a spreading device 500 by a transportation means (not shown in the figure).

The spreading device 500 spins the mated first substrate 6 and second substrate 9 together for a specific time t at a specific high speed rotational speed r2, and spreads the light-setting resin PP between the substrate 6 and the substrate 9 by means of centrifugal force. Note that at this time the light-setting resin PP is suctioned from the inside circumference by a specific suction pressure P (mmHg) so that the light-setting resin PP at the inside circumference side moves to the inside circumference area and there is not a deficiency of light-setting resin PP at the inside circumference. Note, further, that this inside circumference suction is described below with reference to FIG. 8. The spread, laminated substrates 6 and 9 are then supplied to the temporary holding device 600 by a transportation means (not shown in the figure). It should be noted that unused light-setting resin PP overflowing from the substrates in the coating device 300, laminating device 400, and spreading device 500 is recovered to the recovery tank 11 of adhesive supply source 100, and foreign matter is removed by filter 12, intermixed bubbles are removed by defoaming tank 13, and the recovered light-setting resin PP is stored at a specific temperature T in the dropping tank 2 for viscosity control. This adhesive supply source 100 is described later below with reference to FIG. 6.

After the temporary holding device 600 provisionally secures the spread substrates 6 and 9 by irradiating parts thereof with ultraviolet rays to harden the adhesive layer AS in parts, the substrates are supplied to the bonding device 700 by a transportation means (not shown in the figure). The temporary holding device 600 may also be termed as a provisional bonding device. Note that the temporary holding device 600 is described later below with reference to FIG. 10.

The bonding device 700 irradiates the provisionally secured substrates 6 and 9 with ultraviolet rays to harden the light-setting resin PP and fix the two substrates 6 and 9 as a single piece, thereby completing the optical disc recording medium OD. This optical disc recording medium OD is then supplied to the measuring device 800 by a transportation means (not shown in the figure).

The measuring device 800 measures the thickness D of the adhesive layer of the optical disc recording medium OD, and outputs the measurement result to the quality evaluation device 900.

The quality evaluation device 900 determines whether the measured adhesive layer thickness D is within a tolerance range, that is, whether Dmin≦D≦Dmax. If the adhesive layer thickness D is not within the tolerance range, the measurement result is output to the abnormal signal generator 1000; if the adhesive layer thickness D is within the tolerance range, the measurement result is output to the correction signal generator 1100. The quality evaluation device 900 may also be termed as a layer thickness difference detection device.

The error signal generator 1000 receives output from the quality evaluation apparatus 900, and generates an abnormal signal Sm, and outputs to the controller 2000.

The correction signal generator 1100 takes the output from the quality evaluation apparatus 900, and generates a correction signal for correcting the various work condition parameters N, V, v, r1, υ, r2, t, and P, and outputs to the adhesive supply source 100, coating device 300, and spreading device 500. In this way, the quality evaluation device 900, abnormal signal generator 1000, and correction signal generator 1100 constitute an assurance means 3000 for assuring the thickness of the adhesive layer AS of the produced optical disc recording medium, and correction operation of the optical disc lamination manufacturing apparatus ODB. The assurance means 3000 may also be termed as a control device.

In order to control overall the operation of the optical disc lamination manufacturing apparatus ODB, the controller 2000 exchanges various signals with the optical disc lamination manufacturing apparatus ODB, and, in response to the abnormal signal Sd from the bonding device 700, the controller stops operation of the optical disc lamination manufacturing apparatus ODB or controls separation and removal of an optical disc recording medium OD in which the adhesive layer thickness D is abnormal.

Figure 2:
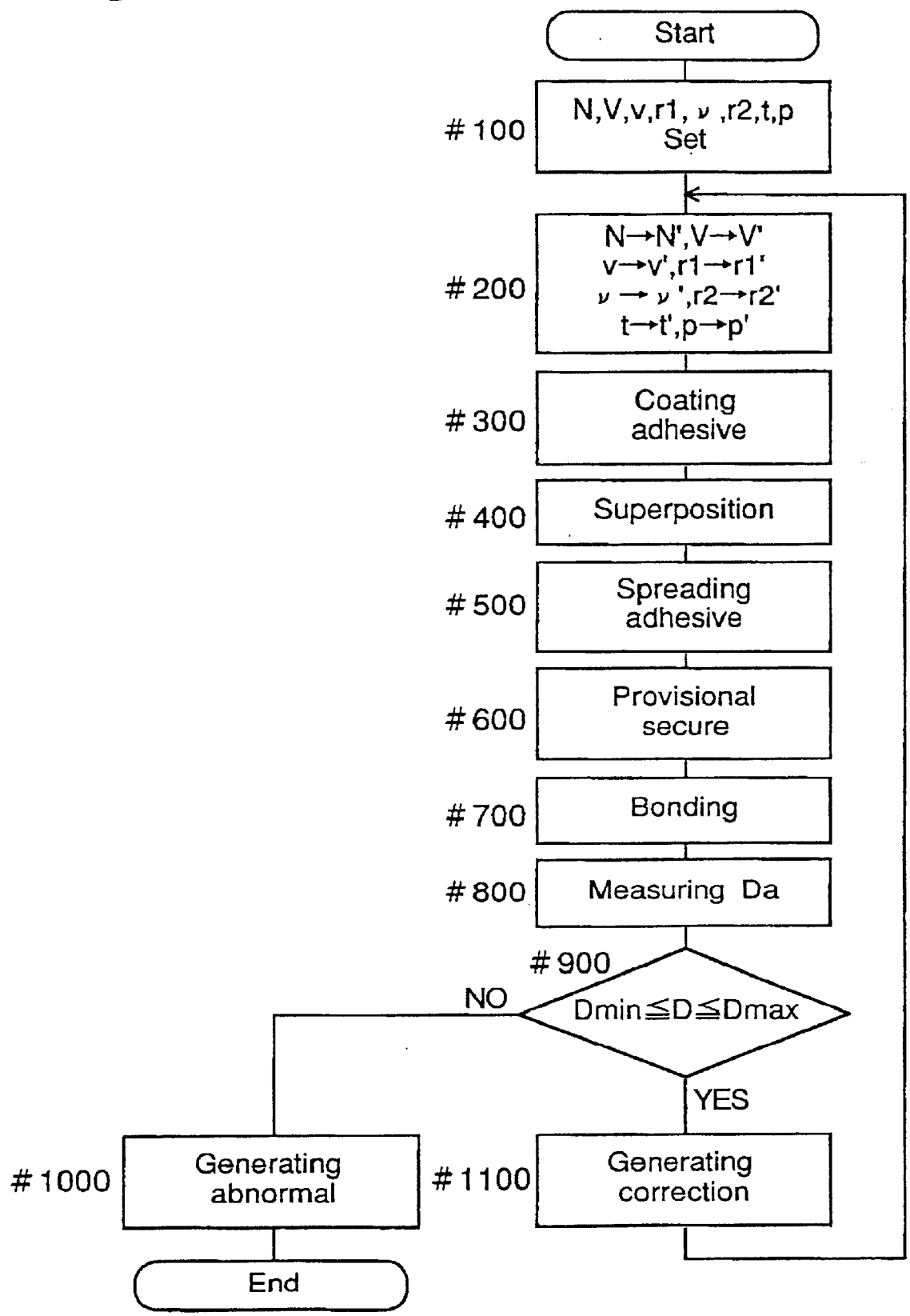
FIG. 2 is a flow chart showing an operation of the optical disc lamination manufacturing apparatus shown in FIG. 1.

The operation of the optical disc lamination manufacturing apparatus ODB is described next with reference to the flow chart in FIG. 2.

When optical disc lamination manufacturing starts at step #100, the above-described work parameters N, V; v, r1, υ, r2, t, and P are set. Note that the significance of these conditions is described individually in the steps below.

Firstly, the parameters are initialized to specific values. Included in these parameters are: the number of rotations N of the substrate when light-setting resin PP is dropped on the substrate; weight V(g) of the light-setting resin PP dropped on the substrate; weight per second v of the light-setting resin PP dropped on the substrate; rotational speed r1 (rpm) of the substrate when the light-setting resin PP is dropped on the substrate; viscosity υ (cps) of the light-setting resin PP; rotational speed r2 (rpm) of the substrate when the light-setting resin PP is spread; rotation time t (sec) of the substrate when the light-setting resin PP is spread; and suction force P (mmHg) suctioning the light-setting resin PP to the inside circumference part during the spreading process. Note that the significance of these conditions is described individually in the steps below. After setting these various conditions to specific values, the procedure advances to the next step #200.

In response to the correction signal Sc from the adhesive supply source 100, the work parameters N, V, v, r1, υ, r2, t, and P are updated, respectively, to N', V', v', r1', υ', r2', t', and P'. The method of calculating these updated parameters is described with regard to step #1100. It will be obvious that because the correction signal Sc has not been generated immediately after the startup of the optical disc lamination manufacturing apparatus ODB, the procedure advances to the next step #300 without the work parameters being updated.

Figure 3:
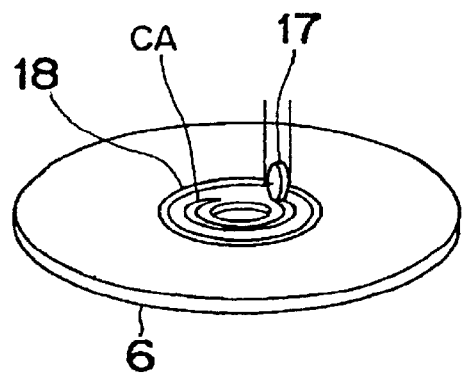
FIG. 3 is an explanatory diagram of an adhesive coating method shown in FIG. 2.

In step #300, as shown in FIG. 3, while the first substrate 6 is rotated a specific N number of times at a specific low rotational speed r1, a specific weight Vg of the light-setting resin PP used as the adhesive of the substrates to be laminated is dropped from the tip 17 of a dropping nozzle 2n of the dropping tank 2 (FIG. 1) such that the light-setting resin PP is coated to form an annular peak concentrically to the center hole H of the substrate 6. Note that the relationship between work parameters during coating can be expressed by the following equation 1.

$$N = \alpha \cdot r1 \cdot V / 60 \cdot v \tag{1}$$

Note that exemplary values used in the present embodiment are V=3.3 g, v=1.65 g, r1=60 rpm, and coefficient α=1, the resultant N=2 is obtained. That is, by rotating the first substrate 6 twice between the beginning and end of dropping the light-setting resin PP, an annular mound CA of a specific shape can be formed. After annular mound CA is thus formed, the procedure advances to the next step #400.

In step #400, the two substrates 6 and 9 are superposed as described above so that bubbles do not become intermixed between the annular mound CA of light-setting resin PP and the protective layers PL1 and PL2. The procedure then advances to the next step #500.

In step #500, the substrates 6 and 9 superposed as one body with annular mound CA disposed therebetween are spun at high speed for a specific time t at a specific rotational speed r2 to spread the light-setting resin PP while suctioning the light-setting resin PP from the inside circumference side with a specific suction force P, and the procedure then advances to the next step #600. Note that the relationship between the work parameters during spreading can be expressed by the following equation 2 and equation 3.

$$D = \alpha 1 \cdot P \cdot V \cdot \upsilon / r2 \cdot t \tag{2}$$

where α1 is a coefficient.

$$\upsilon = \alpha 2 / T \tag{3}$$

where α2 is a coefficient and T is absolute temperature in degrees Kelvin.

If a coefficient α is defined as α=α1·α2, then the next equation 4 can be derived from equation 1.

$$D = \alpha \cdot P \cdot V / r2 \cdot t \cdot T \tag{4}$$

Figure 4:
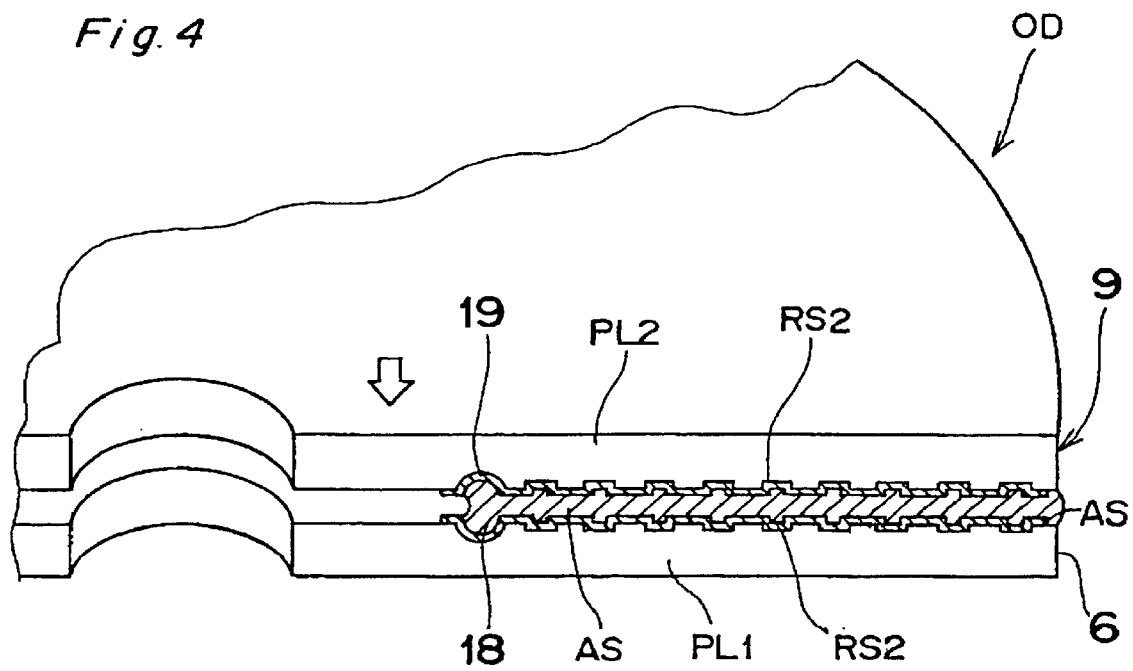
FIG. 4 is an explanatory diagram of an adhesive spreading method shown in FIG. 2.

A ridge CA of coated adhesive, and the condition of the adhesive layer AS formed by spreading the same ridge CA between substrate 6 and substrate 9, are shown together in FIG. 4.

In step #600, ultraviolet ray is irradiated to the spread substrates 6 and 9 to provisionally secure the substrates, and the procedure advances to the next step #700. The provisionally securing device 600 will be described later with reference to FIG. 10.

In step 700, the provisionally secured substrates 6 and 9 are irradiated with ultraviolet rays to harden the light-setting resin PP and fix the two substrates 6 and 9 as a single piece, thereby completing the optical disc recording medium OD. The procedure then advances to the next step #800.

Using a laser focus displacement sensor, the thickness Da of adhesive layer AS is measured in step #800, and an adhesive layer thickness signal Sd indicative of the measurement result is generated. Then, the procedure advances to the next step #900.

In step #900, it is determined whether the measured adhesive layer thickness D is within a tolerance range, that is, whether Dmin≦Da≦Dmax. If the adhesive layer thickness D is not within the tolerance range, it is conceivable that there is a problem with the optical disc lamination manufacturing apparatus ODB, and a NO is therefore returned, and the procedure advances to the next step #1000.

An abnormal signal Sm indicative of a problem in the optical disc lamination manufacturing apparatus ODB is generated in step #1000, and processing is ended.

On the other hand, if in step #900 a YES is returned, that is, if the adhesive layer thickness D is within the tolerance range, the procedure advances to step #1100.

The difference ΔD between a reference layer thickness D and Da is obtained in step #1100. Using this difference ΔD and the above equations 2, 3, and 4, obtaining the parameters N', V', v', r1', υ', r2', t' and P' for approaching the actual adhesive layer Da of the optical disc recording medium OD to the reference thickness D, and the correction signal Sc is generated, and the procedure returns to step #200. It should be noted that while corrected values are here obtained for all of the parameters, it will be obvious that the procedure can be designed to obtain corrected values for only specific parameters. For example, it is possible to first correct rotational speeds r1 and r2, and then correct temperature T as necessary, and then adjust the viscosity υ of the light-setting resin PP. In general, the corrected results are immediately reflected in the adhesive layer thickness D when correction signal Sc correcting the rotational speeds r1 and r2 and time t is output. However, because time is required for the light-setting resin PP in the tank to reach in indicated temperature even when a correction signal Sc correcting temperature T is output, and time is also required for the light-setting resin PP to reach a desired viscosity, it takes time to confirm the corresponding correction results. That is, the correction parameters include both fast action parameters, of which rotational speed r is typical, and delayed action parameters, of which temperature T is typical. By correcting these fast action parameters and delayed action parameters individually, in combination, or in mutual conjunction, the precision of the adhesive layer thickness D can be assured.

In step #200, as described above, the value of each corresponding parameter is updated using the corrected value generated in step #1100, and lamination manufacturing of the optical disc recording medium OD is continued. The process from step #200 to step #1100 continues insofar as an abnormal in the optical disc lamination manufacturing apparatus ODB is not detected. By continuously monitoring the change in work conditions based on the adhesive layer thickness in the actually manufactured optical disc recording medium OD, and using feedback control to correct the monitored work conditions, changes in the work conditions can be corrected, and consistent quality optical disc recording medium OD can be manufactured under always-optimum work conditions.

It should be noted that, while not shown as a specific step in the process, unused light-setting resin PP overflowing from the substrates in the adhesive coating step #300, the superposing step #400, and the spreading step #500 during operation of the optical disc lamination manufacturing apparatus ODB is recovered to the recovery tank 11 of the adhesive supply source 100, foreign matter is removed by filter 12, intermixed bubbles are removed by defoaming tank 13, and the recovered light-setting resin PP is stored at a specific temperature T in the dropping tank 2 for effecting the viscosity control.

Figure 5:
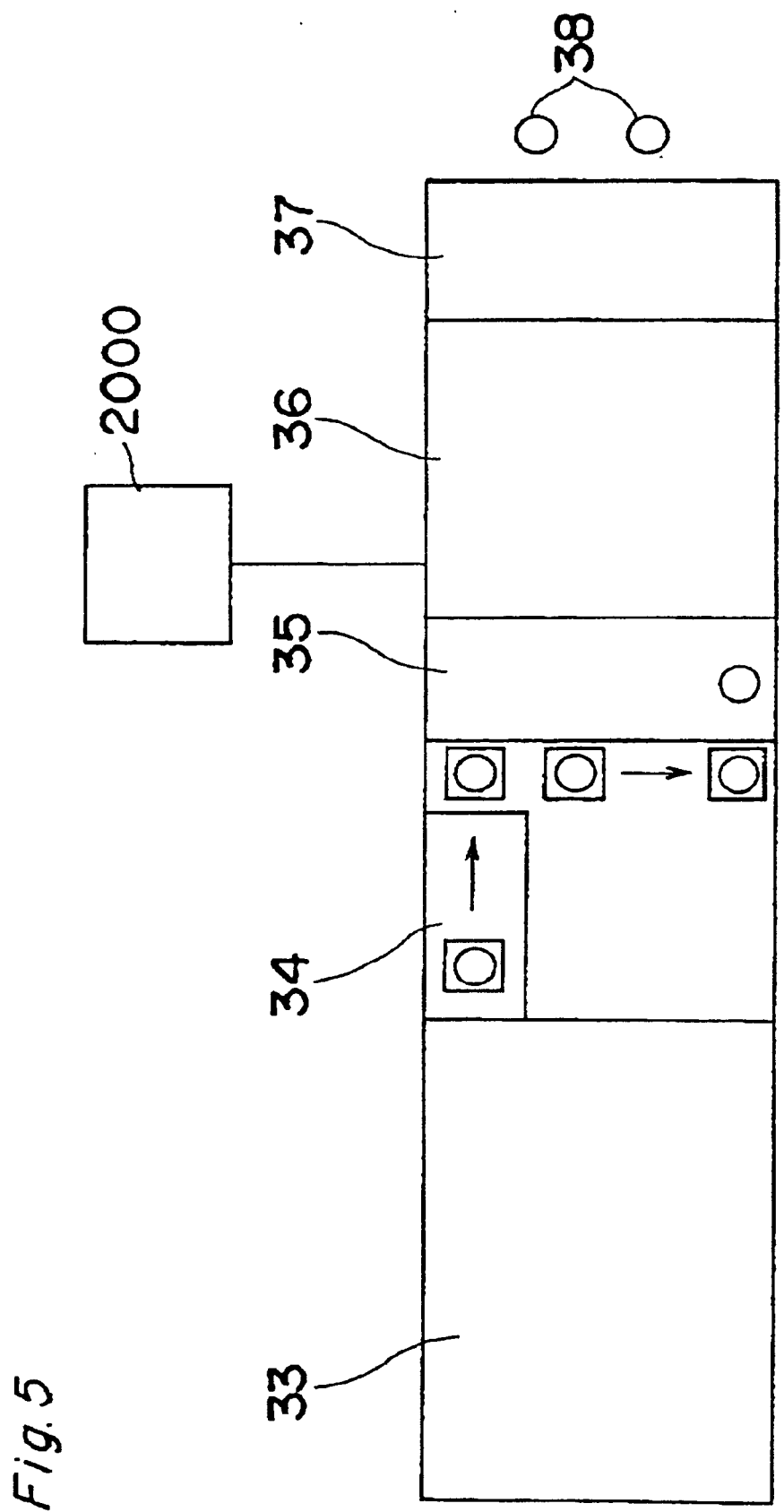
FIG. 5 is a block diagram of an alternative version of an optical disc lamination manufacturing apparatus shown in FIG. 1.

A specific configuration of an optical disc lamination manufacturing apparatus ODB based on the present embodiment shown in FIG. 1 is described next below with reference to FIG. 5, FIG. 6, FIG. 7, FIG. 8, FIG. 9, and FIG. 10. FIG. 5 is a plan view showing a typical is arrangement of the various process implementation sections for holding, transporting, processing, and measuring substrates in a lamination optical disc manufacturing apparatus. An optical disc lamination manufacturing apparatus ODB comprises a primary laminating unit 33 for implementing the above process from adhesive coating (step #300) to provisional bonding (step #600); a bonding unit 34 for irradiating the entire adhesive layer of the provisionally fixed substrates with ultraviolet ray to cure the adhesive and complete the optical disc recording medium OD (step #700); a tilt inspection unit 35 for detecting the tilt of the finished optical disc recording medium OD; a disc flaw inspection unit 36 for confirming the presence of flaws other than tilt in the optical disc recording medium OD; an adhesive layer thickness inspection unit 37 for measuring the adhesive layer thickness D of the optical disc recording medium OD, evaluating the quality of the optical disc recording medium, and generating as needed a work parameter correction signal Sc or abnormal signal Sm (steps #800, #900, #1000, #1100); finished disc recovery unit 38; and controller 2000 for controlling the overall operation of the optical disc lamination manufacturing apparatus ODB.

Figure 6:
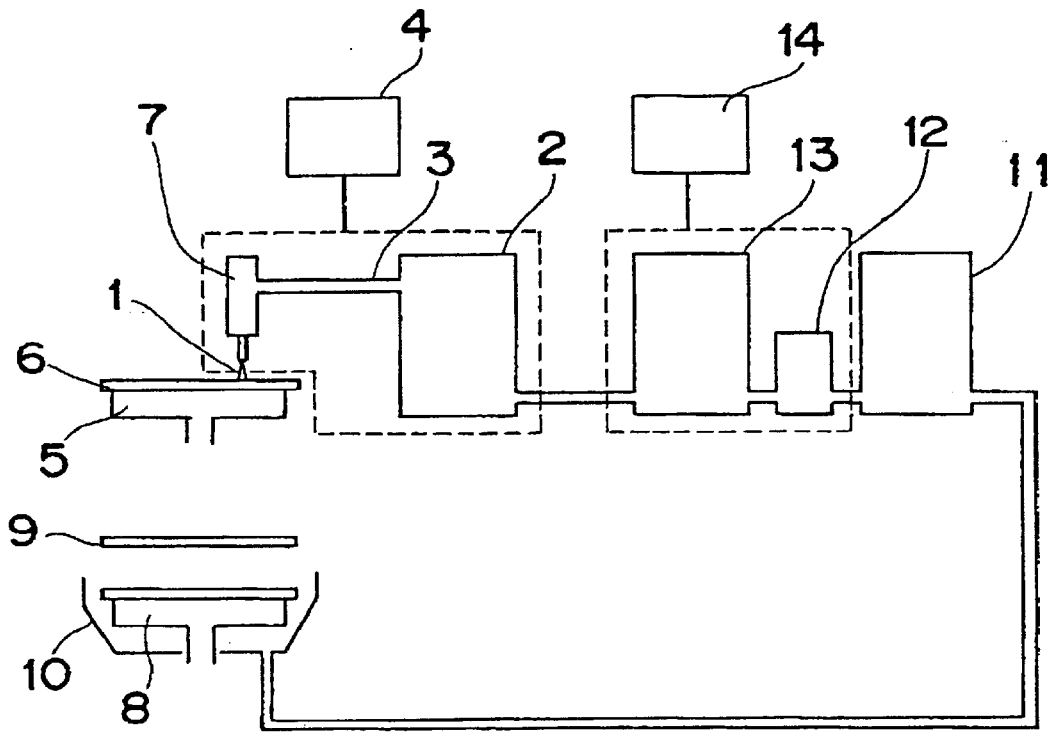
FIG. 6 is an explanatory diagram of an adhesive supply source in a pre-bonding process part shown in FIG. 5.

The configuration of primary laminating unit 33 is described next with reference to FIG. 6, FIG. 7, FIG. 8, and FIG. 9. FIG. 6 shows a typical configuration of the adhesive supply source 100 for recovering and filtering adhesive from the primary laminating unit 33, and then viscosity controlling the recovered adhesive together with fresh adhesive for supply to the primary laminating unit 33. Shown in the figure are a UV-cure resin PP 1, dropping tank 2 for holding the resin to be dropped, tube 3, circulator 4 (exemplary of which is Circulator FC-301 manufactured by e.g. Iuchi Co., Ltd.), turntable 5, bottom substrate 6, dispenser 7, turntable 8, top substrate 9, cup 10, recovery tank 11, filter 12, defoaming tank 13, and heater 14.

The viscosity υ of UV-cure resin PP (hereafter called "resin PP") is adjusted by adjusting the resin temperature to a specific temperature T by means of the circulator 4 while the resin passes through the dropping tank 2 and tube 3 (to a viscosity u of 100 to 10,000 cps, and more preferably to 300 to 1000 cps, by adjusting to a temperature below room temperature, for example), and the resin is then dropped in a donut shape by means of the dispenser 7 onto the lower substrate 6, which is placed on the turntable 5. For example, if the diameter of the substrate is 120 mm, the resin is dropped to form a donut-shaped annular mound CA at a radial position of 15 to 50 mm, and more preferably at a radial position of 25 to 35 mm. The lower substrate 6 is transported to the turntable 8, but because the viscosity υ of the resin PP is several hundred cps or greater, the distribution of the dropped resin is not disturbed by rapid acceleration of the substrate when transported.

Next, the upper substrate 9 is superposed to the lower substrate 6 such that the lamination surfaces thereof are mutually opposed. The turntable 8 is spun at a high speed of 10 to 10,000 rpm, and more preferably at 3000 to 4000 rpm, until resin layer AS is between 40 to 70 nm thick, after spinning for the time required for dispersion of the resin PP between the lower substrate 6 and the upper substrate 9, and the spreading process (step #500) ends.

It should be noted that the preferable rotational speed r2 and rotation time t varies according to the viscosity of resin PP and other conditions. For example, if the viscosity υ of resin PP is 700 cps, the rotational speed when the rotation time is 5 seconds is preferably 3000 to 3500 rpm.

Resin PP expelled from the outside circumference of the substrate during spreading is recovered by the cup 10 and collected in the recovery tank 11. The resin PP in the filter 12 or defoaming tank 13 is adjusted to a low viscosity υ by adjusting the temperature thereof by means of the heater 14. The resin PP is pressure fed from the recovery tank 11 to the filter 12 for filtering. After defoaming for a specific period in the defoaming tank 13, the resin is sent to the dropping tank 2 and reused for dropping onto the lower substrate 6. By warming the resin PP above room temperature, the viscosity υ is adjusted to a viscosity of 10 to 1000 cps, that is, to below the room temperature viscosity, and more preferably to 50 to 300 cps, and the time required for the filtering and defoaming processes can be shortened than that required at room temperature. That is, if the specific temperatures of the filtering and defoaming processes are T1 and T2, respectively, the dropping temperature T is below T1 and T2, and T1 and T2 can be the same temperature.

It should be noted that the same effect can be achieved by adjusting the temperature of the environment surrounding the turntable 5 and turntable 8 using an air conditioner in place of the circulator 4. Disturbing the distribution of resin dropped onto the substrate caused by transportation of the substrate can also be reduced by using the same turntable in common for the turntable 5 and turntable 8.

Figure 7:
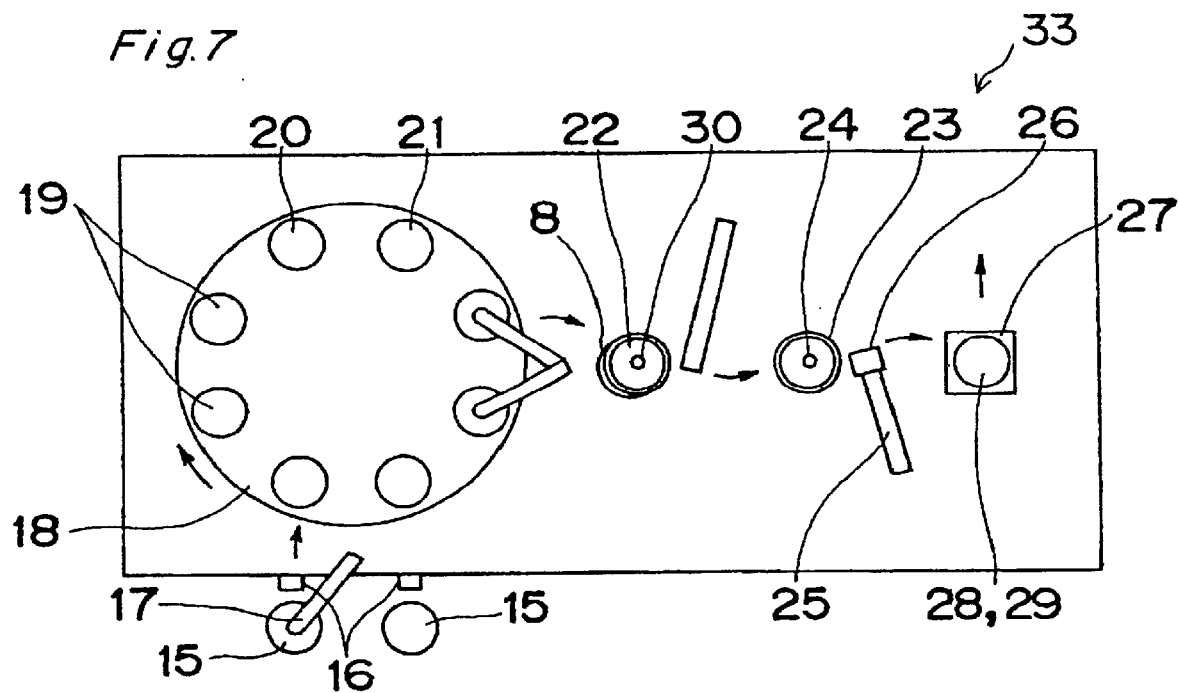
FIG. 7 is an explanatory diagram of a substrate processing part of the pre-bonding process part shown in FIG. 5.

FIG. 7 is a typical illustration showing in brief the primary laminating unit 33 used for lamination. The primary laminating unit 33 comprises a substrate supply unit 15, a static elimination blower 16, substrate supply arm 17, a pre-process table 18, a deburring and static elimination processing unit 19, an adhesive dropping unit 20, a substrate reversing unit 21, a turntable 23, boss 24, transportation arm 25, a UV irradiator 26 for temporary fastening, a pallet 27, and a boss 30. The boss 30 may also be termed as a suction device. Also provided are a lower straightening plate 28 and an upper straightening plate 29 for clamping the substrates from above and below to correct substrate warping. The lower straightening plate 28 and the upper straightening plate 29 collectively comprise a warping prevention device. Note that a disc body 22 having an upper substrate 9 and lower substrate 6 integrally superposed with resin layer AS therebetween is placed on the turntable 8.

The substrates to be laminated are supplied to the substrate supply unit 15 using separate stacking poles for the lower substrate 6 and upper substrate 9. With the substrates on the stacking poles, air is blown over the substrates from the edge faces thereof using the static elimination blower 16 to remove foreign matter on the substrate surfaces and to separate individual substrates so that they do not stick when removing the stacked substrates. The lower substrate 6 and upper substrate 9 are taken out from the stacking pole using the substrate supply arm 17, and are supplied to the pre-process table 18.

The inside circumference portions of the laminated substrate surfaces are compressed by a press in the burr-removal and static elimination processing unit 19 to remove any burrs that occurred during molding on the lamination surfaces of the lower substrate 6 and the upper substrate 9, and the substrate surfaces are then sprayed with stream of air while rotating the substrates to clean the lamination surfaces of the substrates. Dust is vented from a dust removal port to maintain a specified degree of cleanness inside the chamber of the burr-removal and static elimination processing unit 19.

The lower substrate 6 is placed on the turntable of the resin dropping unit 20 with the lamination surface up, and UV-cure resin PP (hereafter called "resin PP") is dropped in a donut shape on the lamination surface by the dispenser 7 (FIG. 6). For example, for a 120 mm diameter disc, thee resin is dropped in a donut shape at a radial position of 15 to 50 mm, and more preferably at a radial position of 25 to 35 mm. The upper substrate 9 is reversed by the substrate reversing unit 21 top and bottom so that the lamination surface is facing down. Next, the lower substrate 6 is moved from the pre-process table 18 to the turntable 8, and the upper substrate 9 is then superposed to the lower substrate 6 with the lamination surfaces thereof mated, and dispersion of the resin PP between the lower substrate 6 and the upper substrate 9 is then awaited. By maintaining a constant gap between the lower substrate 6 and the upper substrate 9 at this time, dispersion can be quickly accomplished.

After the dropped resin PP has spread to a position in a distance of 0 to 10 mm to the outside circumference side, and more preferably to a position in a distance of 0 to 2 mm to the outside circumference side, from the target position at the innermost circumference of the finished disc, the turntable 8 is then rotated at a high speed where r2 is 10 to 10,000 rpm, and r2 is more preferably from 3000 to 4000 rpm, until the resin layer AS thickness is in a degree of 40 to 70 μm, to thereby manufacture the disc 22. It should be noted that the desirable rotational speed r2 and rotation-time t will vary according to the viscosity υ of the resin PP or the rotation time t. For example, if the viscosity υ of resin PP is 700 cps, the rotational speed r2 when the rotation time is 5 seconds is preferably 3000 to 3500 rpm.

The resin PP between the lower substrate 6 and upper substrate 9 moves to the outside circumference part of the substrates during the high speed rotation. The amount of resin PP that moves increases if the time t of high speed rotation increases or the rotational speed r2 increases, and a gap that is not filled with the resin PP can be formed at the inside circumference area between the lower substrate 6 and the upper substrate 9. The appearance of the disc 22 deteriorates as a result of such a gap, and the variation in resin layer thickness increases.

Figure 8:
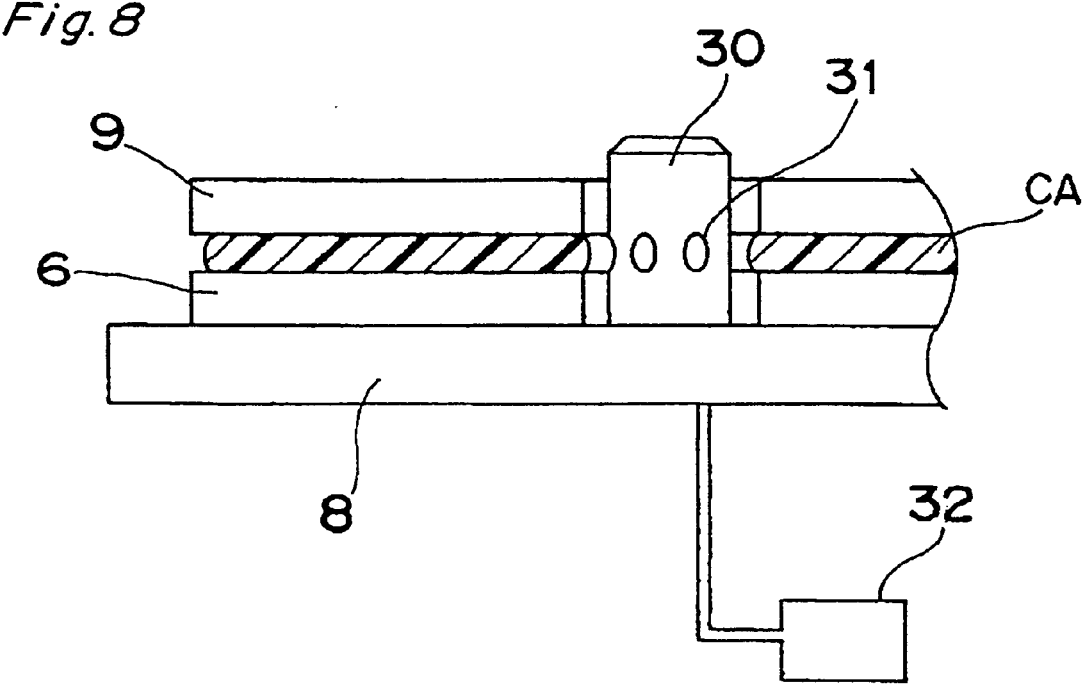
FIG. 8 is a typical illustration showing the substrate inner circumference suction mechanism used in the spreading part shown in FIG. 7.

The structure of the periphery of the boss 30 in the turntable 8 is shown in FIG. 8. Resin PP that has spread and protruded from the center hole of the lower substrate 6 or upper substrate 9 is collected by a suction pump 32 through a suction port 31 provided in the boss 30. By using this mechanism, by suctioning the resin PP between the lower substrate 6 and upper substrate 9 by a force P (referred to as "inside circumference suction") greater than the centrifugal force acting on the resin PP from the substrate center side due to the high speed rotation, it is therefore possible to suppress excessive movement of the resin PP located on the inside circumference side of the substrates toward the outside circumference side of the substrates during the period of spinning the substrates 6 and 9 at high speed.

After this high speed spinning is completed, the disc 22 is transported to the turntable 23 for a centering process for correcting offset between the centers of the lower substrate 6 and the upper substrate 9 by passing the disc 22 onto a boss 24 of a specific diameter. The boss 24 may also be termed as a centering device. The offset between the centers of both substrates can be suppressed by this centering process to at most the difference between the boss diameter and the center hole diameter of the lower substrate 6 and upper substrate 9. For example, if the center hole diameter of both substrates is 15.070 mm and the diameter of the boss 24 is 15.055 mm, the offset can be suppressed to 15 μm or less.

Bubbles may become mixed with the resin layer in the inside circumference part of the disc as a result of loads acting on the uncured resin layer during transportation and centering of the disc 22 after spreading the resin. These bubbles can be removed by repeating the inside circumference suction by the turntable 23 (this is called "repeat suction" below). Protrusion of resin to the edge of the inside circumference hole of the disc 22 as a result of variations in the dropped resin volume, and unfilled resin gaps between the substrates, can also be prevented by repeat suction.

Using the UV irradiator 26, which is mounted on a transportation arm 25, for provisional bonding, ultraviolet ray is irradiated in spots at the inside circumference portion of the disc to harden the resin, and thus provisionally secure both substrates by locally bonding the lower substrate 6 and upper substrate 9 together. The alignment of the lower substrate 6 and upper substrate 9 will thereafter not slip, and the disc 22 can be transported while preventing introduction of bubbles into the inside circumference area. The boss 24 of the turntable 23 in this case has the same structure as the boss 30 shown in FIG. 8. Resin PP that has spread and is protruded from the center hole of the lower substrate 6 or upper substrate 9 is collected by a suction pump 32 through a suction port 31 formed in the boss 30.

After the UV spot irradiation process is completed, the disc 22 is transported to a pallet 27, and interposed between a glass lower straightening plate 28 and glass upper straightening plate 29 to suppress the substrate from warping, and sent to the UV irradiation process. The straightening plates are more preferably made of a high UV transmittance material (such as quartz glass). In addition, the disc contact surface side of the lower straightening plate 28 and upper straightening plate 29 preferably comprises surface protrusions such as stacking ribs, or is shaped along a step formed by the molding conditions between the clamping area surface and the signal area RS surface of the substrate, as a means of assuring the flatness of the laminated substrate surfaces.

The disc contact surface sides of the lower straightening plate 28 and upper straightening plate 29 are also formed to straighten the clamping area, the outside circumference area, or both the clamping area and outside circumference area, while avoiding the signal areas RS1 and RS2 of the disc 22. As a result, it is possible to prevent marring the substrate surface area corresponding to the signal areas RS1 and RS2 of the disc 22 as a result of foreign matter caught between the disc 22 and both straightening plates.

The process parts downstream of the primary laminating unit 33 are described next with reference to FIG. 5. After provisional bonding of the substrates (step #600) by the primary laminating unit 33, the disc 22 is transported to the bonding unit 34 together with the pallet 27. The disc 22 is irradiated with ultraviolet rays by the bonding unit 34 to cure the resin layer AS and thereby integrally bond the lower and upper substrates 6 and 9. The bonding unit 34 blows cooled air over the disc 22 to prevent the temperature of the disc 22 from rising as a result of the high temperature produced by heat from the UV lamp.

If the curing of the resin PP at the outside circumference edge of the disc 22 is insufficient, the tilt of the disc 22 increases, and it is therefore necessary to also irradiate the edge with ultraviolet rays to sufficiently cure the resin PP. Therefore, in order to guide the ultraviolet rays emitted from above or below the disc 22 to the outside circumference edge of the disc 22, a reflector with the mirror surface thereof substantially parallel to the outside disc circumference edge is provided on the transportation pallet 27, surrounding the outside circumference of the disc 22. The material of the reflection mirror is preferably a mirror-finished aluminum with high UV reflectivity.

After final curing by UV irradiation, the disc 22 is sent to each inspection unit, and is inspected for tilt by the tilt inspection unit 35 using a suitable tilt inspection device (for example, an SH3DL-12NE manufactured by Admon Science Corporation). The disc 22 is inspected for the presence and degree of flaws by the disc flaw inspection unit 36 using a suitable flaw inspection device (for example, a VCD120C manufactured by Dr. Schenk Co.). Using a laser focus displacement sensor (for example, an LT-800 manufactured by Keyence Corp.) or other measuring device, the adhesive layer thickness inspection unit 37 measures the thickness D of the adhesive layer AS. The measured adhesive layer thickness D is then compared with a specific reference value to evaluate the quality of the optical disc recording medium, and judges whether the operating condition of the optical disc lamination manufacturing apparatus ODB is within a tolerance range in which operation can be corrected by adjusting the operating parameters, or whether there is an abnormal problem with operation that cannot be corrected by adjusting the operating parameters. If the optical disc recording medium is flawed, the finished disc recovery unit 38 separates the good and the flawed pieces, and recovers them to respective stacking pole. Note that of the flawed pieces, pieces identified by flaw inspection must be analyzed to determine the cause, and are therefore recovered separately from the other flawed pieces. If correction is possible, a parameter correction signal is generated and fed back to the primary laminating unit 33 for servo control. If an abnormal problem is detected, an abnormal signal Sd is generated, and appropriate measures, such as stopping of the optical disc lamination manufacturing apparatus ODB, are taken.

Figure 9:
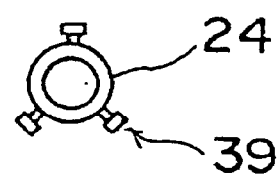
FIG. 9 is a plan view showing a typical substrate centering mechanism used in a temporary holding part shown in FIG. 7.
Figure 10:
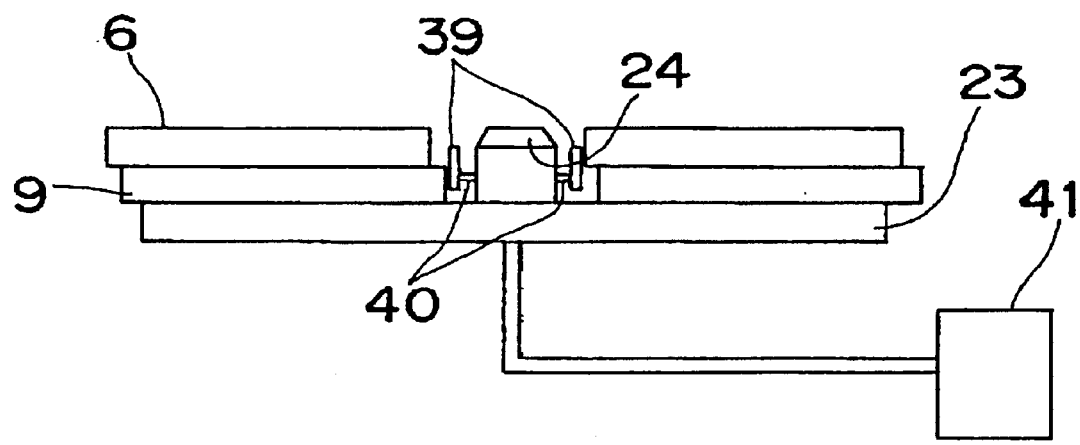
FIG. 10 is an explanatory diagram of centering the superposed two substrates by means of the substrate centering mechanism shown in FIG. 9.

The structure of the boss 24 used in the centering process is described next with reference to FIG. 9 and FIG. 10. FIG. 9 is a plan view of the boss 24, and FIG. 10 is a typical illustration showing the disc 22 set on the turntable 23. Pin 39 is just long enough to simultaneously contact the inside circumference edges of the lower and upper substrates 6 and 9, and the longitudinal axis of the pin 39 is disposed substantially parallel to the thickness direction of the lower and upper substrates 6 and 9. Reference numeral 40 is an air cylinder, and 41 is a pump capable of pumping air in and out. During centering, air is sent by the pump 41 to cylinder 40, thereby extending the cylinder 40 and pushing the pin 39 in the direction of the outside circumference of the lower and upper substrates 6 and 9. The pin 39 aligns the edges of the lower and upper substrates 6 and 9, and aligns the centers of the substrates 6 and 9. The same effect can be achieved by providing a pin with an equivalent means on the transportation arm 25 itself. It should be noted that while at least two pins 39 are needed, there are preferably three. By also providing the suction mechanism shown in FIG. 8 to the boss 24, the center offset can be substantially corrected while preventing introduction of bubbles into the adhesive layer AS.

The adhesive layer AS can thus be locally cured to provisionally bond the disc 22 by locally irradiating ultraviolet rays to the adhesive layer AS of the centered disc 22 while applying a specific suction force P1 (mmHg) by means of boss 24 thus configured. However, the inside circumference edge is preferably hardened for provisional bonding. Moreover, if required, the outside circumference part of the adhesive layer AS is also irradiated to cure two locations, that is, at the inside circumference side and the outside circumference side.

Figure 11:
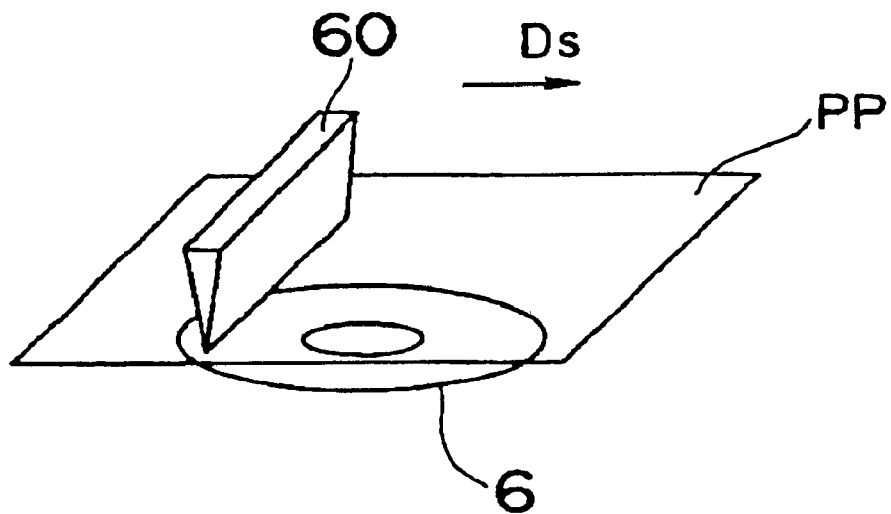
FIG. 11 is an explanatory diagram of an adhesive coating method based on a printing technique.
Figure 12:
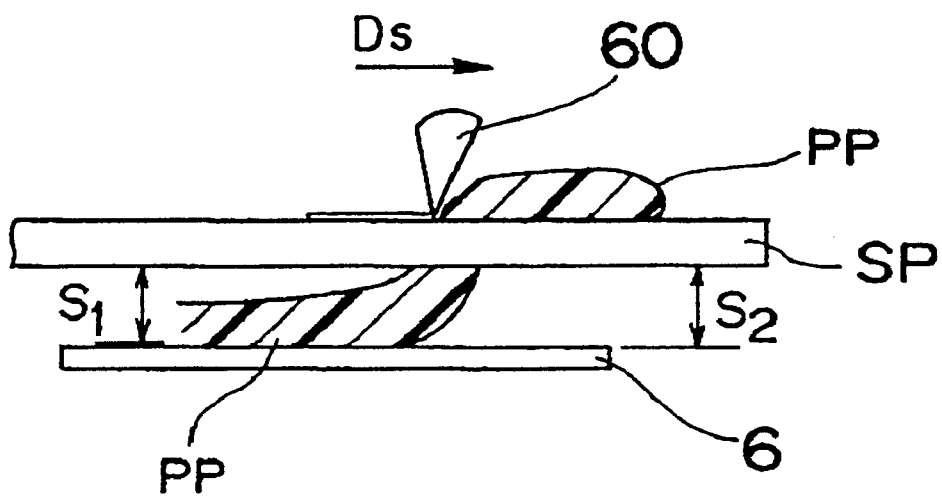
FIG. 12 is an explanatory diagram of adhesive distribution on a substrate by means of a printing technique.
Figure 13:
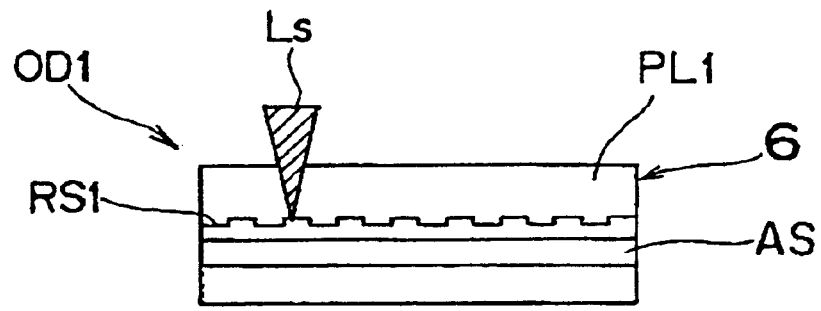
FIG. 13 is a typical illustration showing the structure of a single-sided, single-layer disc.
Figure 14:
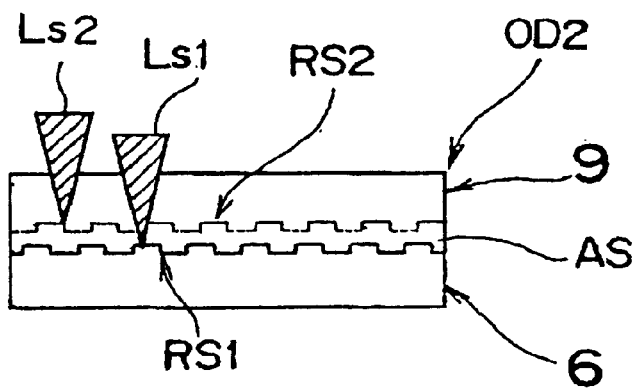
FIG. 14 is a typical illustration showing the structure of a single-sided, double-layer disc.
Figure 15:
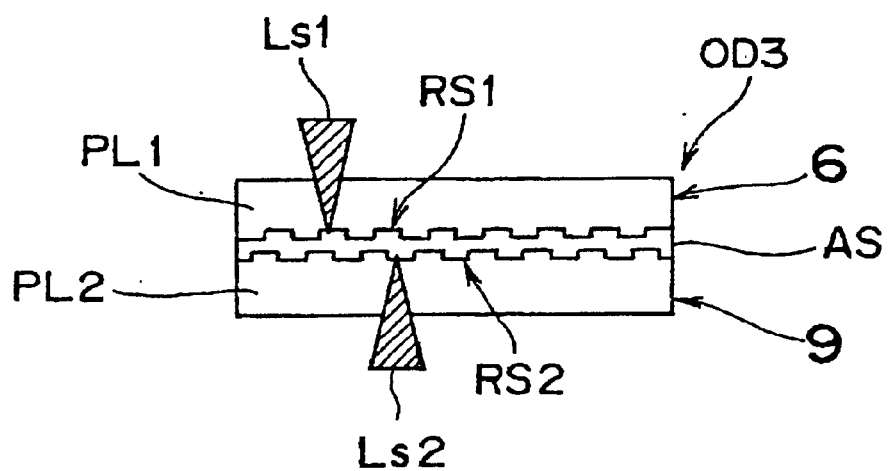
FIG. 15 is a typical illustration showing the structure of a double-sided, single-layer disc.
Figure 16:
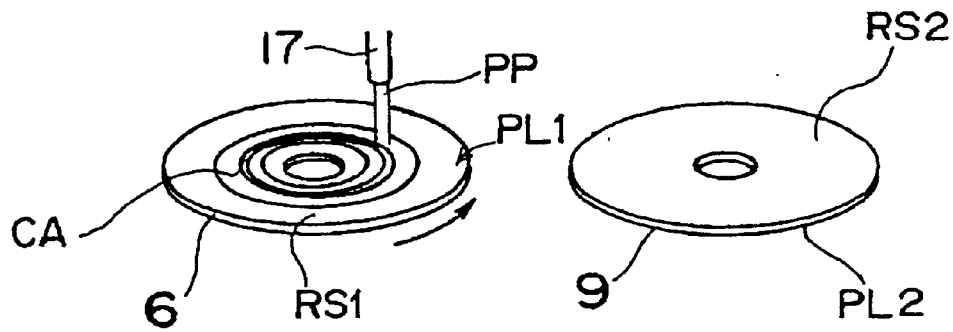
FIG. 16 is an explanatory diagram of an adhesive coating method based on a spin coating technique.
Figure 17:
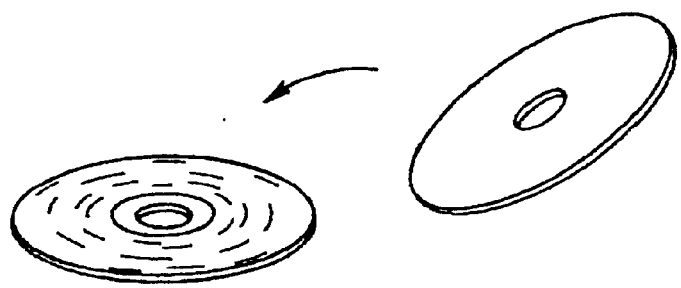
FIG. 17 is an explanatory diagram of substrate lamination after adhesive coating based on a spin coating technique.
Figure 18:
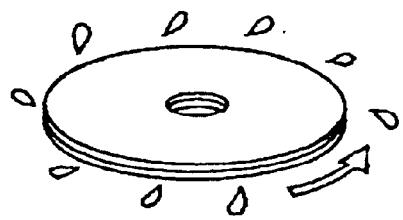
FIG. 18 is an explanatory diagram of an adhesive spreading method based on a spin coating technique.
Figure 19:
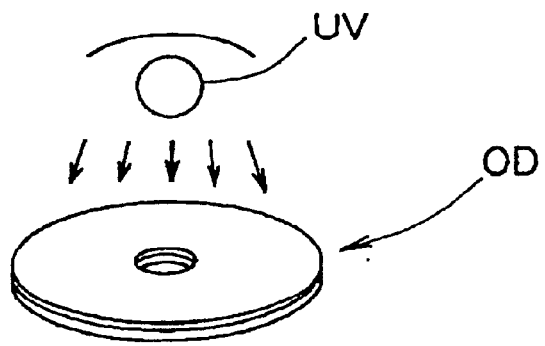
FIG. 19 is an explanatory diagram of a substrate bonding method after adhesive spreading based on a spin coating technique.
Figure 20:
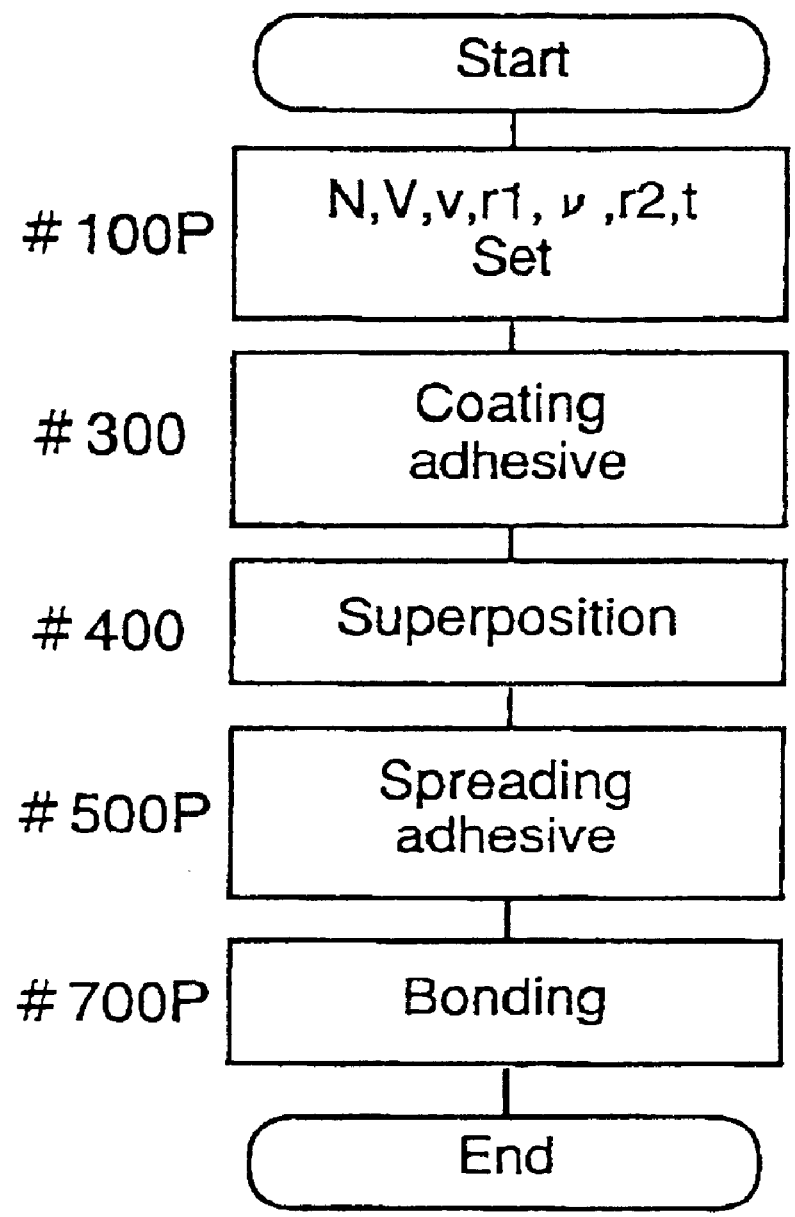
FIG. 20 is a flow chart showing a conventional optical disc laminating method based on a spin coating technique.

Next, with reference to FIG. 12, described is an application to optical disc manufacture using a printing method of servo control according to the present invention where the optical disc recording medium quality and the operating condition of the optical disc lamination manufacturing apparatus are detected based on the measured adhesive layer thickness D of the optical disc recording medium, and the operating conditions of the optical disc lamination manufacturing apparatus are changed based on the detected result. Description of the printing method and apparatus is omitted because these are known to public. Note that, except for the processes specific to the adhesive coating method of the printing method described with reference to FIG. 11 and FIG. 12, this method is basically identical to the above-described spin coating method.

As previously described, the thickness of the adhesive layer AS varies in the diametric direction by |D1−D2| as a result of print coating. If the substrate diameter is DM, whether the substrate and the coating direction of the adhesive are parallel, that is, inclination θ therebetween, can be expressed by the following equation 5:

$$\tan \theta = |D1-D2|/DM \quad (5)$$

In addition, the relationship between adhesive layer thickness D and distance S between the screen SP and the substrate can be expressed by equation 6 below:

$$D = \alpha 3 \cdot V \cdot S \quad (6)$$

where α3 is a coefficient.

In other words, to correct the thickness distribution (degree of parallelism) of the adhesive layer on a substrate, correction angle Δθ for adjusting the relative angle between the screen SP and the substrate is calculated based on Equation 5 to generate a correction signal Sc.

When the thickness distribution of the adhesive layer is ignorably small, but correction of the thickness D itself is needed, ΔS is calculated based on Equation 6 to generate the correction signal Sc.

By controlling the adhesive temperature to adjust the viscosity for each process when forming an adhesive layer between a first substrate and a second substrate and laminating the first substrate and second substrate to produce a disc, it is possible by means of the present invention to consistently manufacture discs with good appearance, and improve the operating efficiency of the manufacturing apparatus.

In addition, when forming an adhesive layer between the first substrate and the second substrate and laminating the first substrate and second substrate, by suctioning the adhesive layer between the first substrate and second substrate from the inside circumference edge of the substrates after rotating the first substrate and second substrate bonded together at high speed to adjust the adhesive layer thickness, it is possible by means of the present invention to consistently manufacture discs is with good appearance free of intermixed bubbles.

Moreover, when forming an adhesive layer between the first substrate and the second substrate and laminating the first substrate and second substrate, by correcting offset between the centers of the first substrate and the second substrate after rotating the first substrate and second substrate bonded together at high speed, the offset between the centers of the two laminated substrates can be easily suppressed with good precision.

Furthermore, because mixing bubbles into the adhesive layer can be prevented in the present invention, the present invention can be used with all types of discs, including single-sided, single-layer discs, double-sided, single-layer discs, and configurations in which the laser must pass an adhesive layer such as in single-sided, double-layer discs. Because uniform thickness can be maintained at a particular radial position, the thickness at the same circumferential position can be held constant.

In addition, according to the present invention, the optical disc recording medium quality and the operating condition of the optical disc lamination manufacturing apparatus are detected based on the measured thickness Da of the adhesive layer thickness D of the manufactured optical disc recording medium, and the servo control is performed for adjusting the operating conditions of the optical disc lamination manufacturing apparatus based on the detected result, and therefore optical discs having consistently stable quality can be manufactured even if the operating environment and other conditions vary.

Industrial Applicability

As described above, a laminated-type optical disc manufacturing method and manufacturing apparatus therefor according to the present invention can assure the light transmittance of an adhesive layer, and therefore making it easier to achieve multiple layers in an optical disc recording medium. Moreover, the working conditions of all processes can be automatically adjusted based on the adhesive layer thickness in a laminated optical disc, and the present invention is therefore suited to manufacture of optical discs with stable quality.

What is claimed is:

1. A laminated optical disc manufacturing apparatus comprising:
   an adhesive applying device adapted to apply an adhesive to a first substrate in a predetermined amount;
   a superimposing device adapted to superimpose a second substrate on the adhesive applied to the first substrate, such that an adhesive layer is formed between the first substrate and the second substrate;
   a layer thickness measuring device adapted to measure an actual thickness of the adhesive layer between the first substrate and the second substrate;
   a layer thickness difference detection device adapted to determine an adhesive layer thickness difference between the measured adhesive layer thickness and a target adhesive layer thickness; and
   a control device adapted to control at least said adhesive applying device based on the adhesive layer thickness difference.

2. The laminated optical disc manufacturing apparatus according to claim 1, the adhesive applying device further adapted to apply a radiation cure resin.

3. The laminated optical disc manufacturing apparatus according to claim 1, the adhesive applying device further adapted to apply a thermoplastic resin.

4. The laminated optical disc manufacturing apparatus according to claim 1, said control device being further adapted to control at least the adhesive applying device based on an adhesive layer thickness difference between the measured adhesive layer thickness and a target adhesive layer thickness which is within a predetermined tolerance range.

5. The laminated optical disc manufacturing apparatus according to claim 1, said adhesive applying device comprising an adhesive supply source adapted to supply the adhesive, the adhesive being controlled to have a first predetermined temperature, said adhesive supply source comprising:
   an adhesive recovery tank for recovering adhesive unused in the formation of the adhesive layer by said superimposing device;
   a filter adapted to filter the recovered adhesive at a second predetermined temperature higher than the first predetermined temperature; and
   a defoaming tank adapted to remove bubbles from the filtered adhesive at a third predetermined temperature higher than the first predetermined temperature.

6. The laminated optical disc manufacturing apparatus according to claim 1, further comprising:

a spreading device adapted to integrally rotate the superimposed first substrate and second substrate at a predetermined spreading rotational speed;

wherein said adhesive applying device is further adapted to apply the adhesive at a predetermined application rotational speed onto a predetermined radial position on a first surface of said first substrate, the adhesive forming an annular mound having a top edge of a narrow peak shape in cross section;

wherein said superimposing device is further adapted to superimpose the second substrate on the first substrate by contacting the top edge of the annular mound with the second substrate; and wherein the annular mound is spread from the predetermined radial position toward an outside circumference of the first substrate to form the adhesive layer between the first substrate and the second substrate.

7. The laminated optical disc manufacturing apparatus according to claim 6, further comprising a suction device adapted to suction the annular mound during the spreading operation with a first predetermined suction force, said suction device stopping an edge portion of the adhesive layer in a vicinity of the predetermined radial position.

8. The laminated optical disc manufacturing apparatus according to claim 7, further comprising a provisional bonding device that corrects an offset between a center of the first substrate and a center of the second substrate; partly cures the adhesive layer to partially bond and provisionally fasten the first and the second substrates; and further suctions the adhesive layer with a second predetermined suction force.

9. The laminated optical disc manufacturing apparatus according to claim 8, said provisional bonding device further comprising a centering cylinder insertable within a center hole of the superimposed first and second substrates said centering cylinder comprising at least two contact pins which retractably extend in substantially opposite directions and press against an inside circumferential edge of the center hole in the superimposed first and second substrates.

10. The laminated optical disc manufacturing apparatus according to claim 9, said provisional bonding device being further adapted to cure the suctioned adhesive layer in proximity to the center hole in the superimposed first and second substrates.

11. The laminated optical disc manufacturing apparatus according to claim 8, further comprising a bonding device for completely curing the partly cured adhesive layer and completely bonding the first and the second substrates throughout the adhesive layer.

12. The laminated optical disc manufacturing apparatus according to claim 8, further comprising a warping prevention device for provisionally bonding a partially bonded portion of the first and the second substrates and preventing deformation of the provisionally bonded first and second substrates.

13. The laminated optical disc manufacturing apparatus according to claim 7, said control device controlling said adhesive applying device according to the following equation:

$$\Delta D = \alpha \cdot P \cdot V / r2 \cdot t \cdot T$$

where $\Delta D$ is the adhesive layer thickness difference, $\Delta$ is a predetermined coefficient, P is a first suction force, V is a volume of the applied adhesive, r2 is a predetermined rotational speed, t is an application time, and T is a first predetermined temperature.

14. A laminated optical disc manufacturing method for manufacturing an optical disc the method comprising:

applying an adhesive on a first substrate;

superimposing a second substrate on the first substrate, such that an adhesive layer is formed between the second substrate and the first substrate;

measuring an actual thickness of the adhesive layer between the first substrate and the second substrate;

detecting a layer thickness difference between the adhesive layer actual thickness and a target adhesive layer thickness; and controlling the applying of the adhesive based on the detected layer thickness difference.

15. The laminated optical disc manufacturing method according to claim 14, wherein the controlling further comprises controlling the applying of the adhesive based on a layer thickness difference between the adhesive layer actual thickness and a target adhesive layer thickness which is within a predetermined tolerance range.

16. The laminated optical disc manufacturing method according to claim 14, wherein the applying comprises supplying and coating with the adhesive, wherein the coating comprises:

coating the adhesive controlled to have a first predetermined temperature onto the first substrate; and recovering excess adhesive not used in formation of the adhesive layer during the coating; and wherein the supplying of the adhesive comprises:
filtering the recovered adhesive at a second predetermined temperature higher than the first predetermined temperature; and
removing bubbles intermixed with the filtered adhesive at a third predetermined temperature higher than the first predetermined temperature.

17. The laminated optical disc manufacturing method according to claim 14, wherein the applying comprises providing an annular coating of the adhesive at a first predetermined rotational speed onto a predetermined radial position on a first surface of the first substrate, and forming an annular mound having a top edge of a narrow peak shape in cross section; and wherein the superimposing comprises positioning the second substrate on the first substrate in contact with the top edge part of the annular mound; and integrally rotating the superimposed first and second substrates at a second predetermined rotational speed, which spreads the annular mound from the predetermined radial position toward an outside circumference.

18. The laminated optical disc manufacturing method according to claim 17, the superimposing further comprising:

suctioning the annular mound, during the rotating, with a first predetermined suction force; and stopping an edge portion of the adhesive layer in a vicinity of the first predetermined radial position.

19. The laminated optical disc manufacturing method according to claim 18, further comprising;

correcting an offset between a center of the first substrate and a center of the second substrate;

partially curing the adhesive layer to partially bond and provisionally fasten the first and second substrates; and further suctioning the suctioned adhesive layer with a second predetermined suction force.

20. The laminated optical disc manufacturing method according to claim 19, wherein the correcting the offset comprises simultaneously and removably contacting with a plurality of contact pins, in at least two places and in substantially opposite directions, an inside circumferential edge of a center hole in the superimposed first and second substrates.

21. The laminated optical disc manufacturing method according to claim 20, wherein partially curing of the adhesive layer comprises curing the suctioned adhesive layer in proximity to the center hole in the superimposed first and second substrates.

22. The laminated optical disc manufacturing method according to claim 19, further comprising:

curing the partially cured adhesive layer; and bonding the first substrate and the second substrate throughout the adhesive layer.

23. The laminated optical disc manufacturing method according to claim 19, further comprising holding the provisionally fastened first and second substrates at a partially bonded portion, thereby preventing deformation of the provisionally fastened first and second substrates.

24. The laminated optical disc manufacturing method according to claim 18, wherein the controlling of the coating is based on the following equation:

$$\Delta D = \alpha \cdot P \cdot V / r2 \cdot t \cdot T$$

where $\Delta D$ is the adhesive layer thickness difference, $\Delta$ is a predetermined coefficient, P is a first suction force, V is a volume of the coated adhesive, r2 is a predetermined rotational speed, t is a coating time, and T is a first predetermined temperature.

25. The laminated optical disc manufacturing method according to claim 14, the adhesive comprising a radiation cure resin.

26. The laminated optical disc manufacturing method according to claim 14, the adhesive comprising a thermoplastic resin.

* * * * *

UNITED STATES PATENT AND TRADEMARK OFFICE
CERTIFICATE OF CORRECTION

PATENT NO. : 6,309,485 B1
DATED : October 30, 2001
INVENTOR(S) : H. Miyamoto et al.

It is certified that error appears in the above-identified patent and that said Letters Patent is hereby corrected as shown below:

Column 19,
Line 63, "Δ" (second occurrence) should be -- α --.

Column 22,
Line 8, "Δ" (second occurrence) should be -- α --.

Signed and Sealed this

Ninth Day of July, 2002

Attest:

Attesting Officer

JAMES E. ROGAN
Director of the United States Patent and Trademark Office